United States Patent
Hwang et al.

(10) Patent No.: US 8,313,724 B2
(45) Date of Patent: Nov. 20, 2012

(54) SHORT, FUNCTIONALIZED, SOLUBLE CARBON NANOTUBES, METHODS OF MAKING SAME, AND POLYMER COMPOSITES MADE THEREFROM

(75) Inventors: Wen-Fang Hwang, Midland, MI (US); Zheyl Chen, Houston, TX (US); James M. Tour, Bellaire, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 12/280,523

(22) PCT Filed: Feb. 22, 2007

(86) PCT No.: PCT/US2007/062570
§ 371 (c)(1),
(2), (4) Date: Jan. 15, 2009

(87) PCT Pub. No.: WO2008/054836
PCT Pub. Date: May 8, 2008

(65) Prior Publication Data
US 2009/0215953 A1    Aug. 27, 2009

Related U.S. Application Data

(60) Provisional application No. 60/775,635, filed on Feb. 22, 2006, provisional application No. 60/835,001, filed on Aug. 2, 2006.

(51) Int. Cl.
*C01B 31/00* (2006.01)
*C01B 31/02* (2006.01)

(52) U.S. Cl. .............. 423/460; 423/414; 423/445 R; 524/496; 977/840; 977/842; 977/848; 977/742; 264/104; 264/105

(58) Field of Classification Search .............. 524/496; 423/460, 414, 445 R; 977/840, 842, 848, 977/742; 264/104, 105
See application file for complete search history.

(56) References Cited

U.S. PATENT DOCUMENTS

| | | | |
|---|---|---|---|
| 2004/0223900 A1* | 11/2004 | Khabashesku et al. | 423/447.1 |
| 2005/0147553 A1* | 7/2005 | Wong et al. | 423/447.2 |
| 2006/0188723 A1* | 8/2006 | Rowley et al. | 428/408 |

FOREIGN PATENT DOCUMENTS

| WO | 97/45257 | 12/1997 |
|---|---|---|
| WO | 2005/014708 | 2/2005 |
| WO | 2005/113434 | 12/2005 |
| WO | WO 2005/113434 | * 12/2005 |
| WO | WO 2006/017333 | * 2/2006 |
| WO | WO 2006/135439 | * 12/2006 |

OTHER PUBLICATIONS

Richard Lewis, Sr., Hawley's Cndensed Chemical Dictionary, 1987, Van Nostrand Reinhold, 11$^{th}$ ed., p. 618 and p. 824.*
Zhu, et al., "Reinforcing Epoxy Polymer Composites Through Covalent Integration of Functionalized Nanotubes", Adv. Funct. Mater., 14:2004, pp. 643-648.
Chen, et al., "Soluble ultra-short single-walled carbon nanotubes", J. Am. Chem. Soc., 128:2006, pp. 10568-10571.
Ericson, et al., "Macroscopic, Neat, Single-Walled Carbon Nanotube Fibers", Science, 305:2004, pp. 1447.
Bronikowski, et al., "Gas-phase production of carbon single-walled nanotubes from carbon monoxide via the HiPco process: A parametric study", J. Vac. Sci. Tech. A, 19:2001, pp. 1800-1805.

* cited by examiner

*Primary Examiner* — James J Seidleck
*Assistant Examiner* — Deve E Valdez
(74) *Attorney, Agent, or Firm* — Winstead PC

(57) ABSTRACT

In some embodiments, the present invention relates to new processes to simultaneously shorten and functionalize raw or purified carbon nanotubes to improve their dispersity and processibility, and the short functionalized nanotubes that may be made by the processes. This present invention also relates to new compositions of matter using short functionalized carbon nanotubes with thermoset, thermoplastic polymers, high temperature polymers, and other materials; the processes for making such composite materials; and the products of said processes.

8 Claims, 15 Drawing Sheets

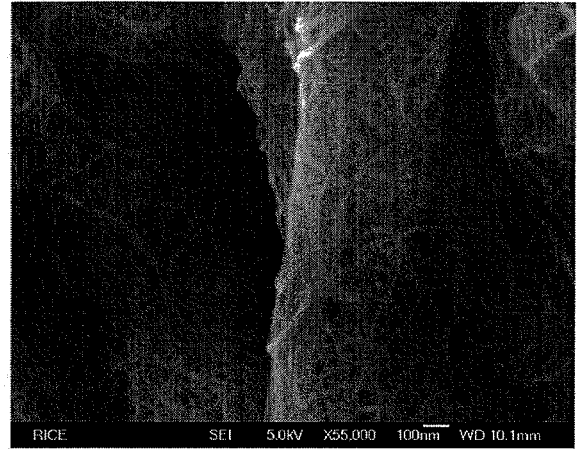
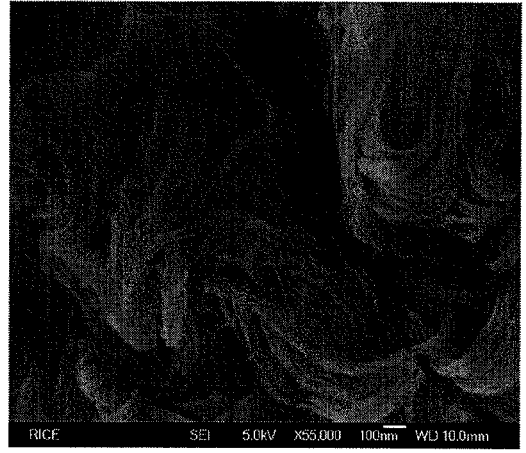
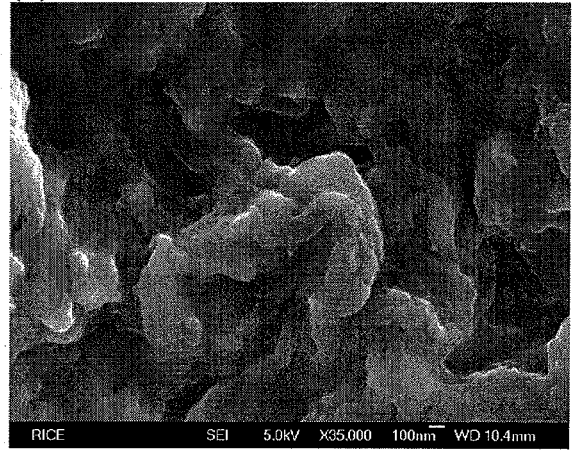
Figures 2A, 2B, and 2C (A)

(B)

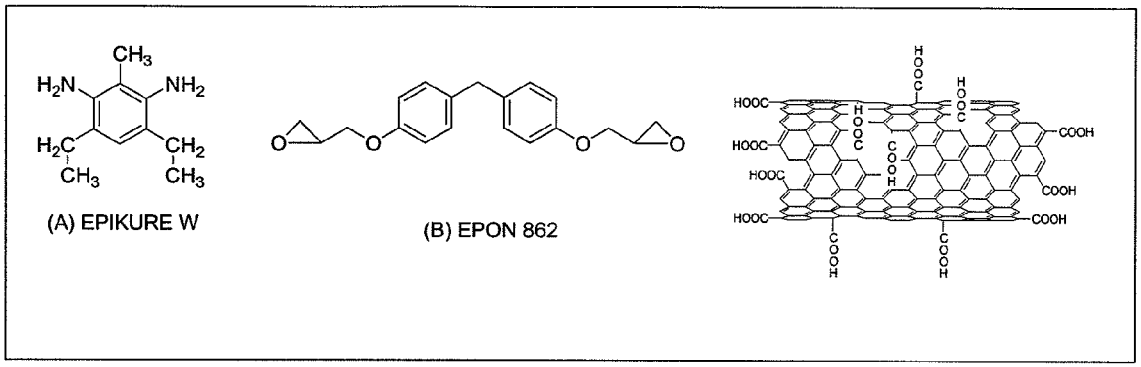
Figures 6A, 6B, and 6C
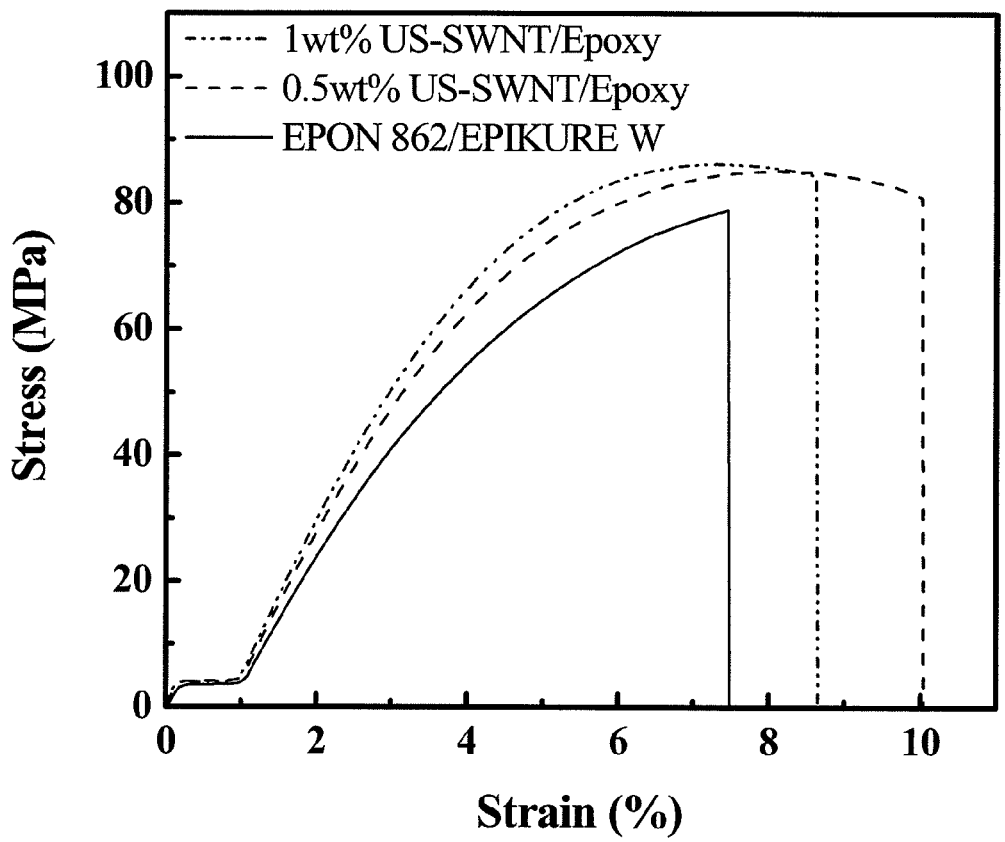
Figure 7

(A)

(B)

SHORT, FUNCTIONALIZED, SOLUBLE CARBON NANOTUBES, METHODS OF MAKING SAME, AND POLYMER COMPOSITES MADE THEREFROM

CROSS REFERENCE TO RELATED APPLICATIONS

This application claims priority to U.S. Provisional application No. 60/775,635, filed on Feb. 22, 2006 and U.S. Provisional application No. 60/835,001, filed on Aug. 2, 2006.

STATEMENT REGARDING FEDERALLY SPONSORED RESEARCH OR DEVELOPMENT

This invention was made with government support under Air Force Office of Scientific Research Grant No. FA9550-05-1-0152, awarded by the U.S. Department of Defense. The government has certain rights in the invention.

FIELD OF INVENTION

This invention relates to short functionalized carbon nanotubes and method of making them. More particularly, the present invention relations to short functionalized carbon nanotubes with improved solubility, dispersity, and processibility with such materials as solvents, monomers, and polymers. This invention further relates to composites and blends of short functionalized carbon nanotubes with polymers and processes for making the composites and blends.

BACKGROUND OF INVENTION

Interest in developing nanocomposites with improved performance properties has increased since the discovery of carbon nanotubes. Carbon nanotubes are known to exhibit desirable properties, depending on their configuration, such as high strength per unit mass, electrical conductivity, thermal conductivity, and luminescence upon irradiation. In particular, carbon nanotubes are attractive for incorporating into composite materials as reinforcement additives, for example, plastics.

As with any composite, it is highly desirable to obtain as close to a homogeneous dispersion of additives as possible to achieve uniform characteristics throughout a material. Previous attempts to incorporate carbon nanotubes into other materials to create composites have tended to meet with limited success due to their poor dispersity. Techniques such as ultrasonication, surfactants, polymer wrapping, and sidewall functionalization have not produced a level of homogeneous blending, improved tensile strength, or modulus characteristics as expected. Typically during production, carbon nanotubes in solvent or other materials tend to aggregate and entangle into a dense, robust network of "ropes" 10-50 nm in diameter and up to μm's in length due in part to strong van der Waals force attraction between tubes. Further, it has been difficult to match desirable solvent characteristics with both carbon nanotubes and other materials, rendering carbon nanotubes difficult to blend with other materials, such as polymers.

There remains a need for techniques that provide carbon nanotubes that are homogeneously dispersible with other materials so as to produce uniform composites, particularly those that are strong and light.

BRIEF DESCRIPTION OF INVENTION

According to some embodiments, the present invention is directed to a scalable process involving simultaneously shortening and functionalizing carbon nanotubes so as to create short functionalized carbon nanotubes. The process may involve exposing the carbon nanotubes to an intercalation agent for the carbon nanotubes and with a reactive agent that is compatible and miscible with the intercalation agent. The exposure of individual carbon nanotube to the intercalation agent may render the reaction more effective in simultaneously shortening and functionalizing the carbon nanotubes so as to afford improved solubility. The short functionalized nanotubes may be modified by derivatization so as to produce short functionalized nanotubes with modified functionalizing groups. The functionalizing groups may be selected for compatibility with a predetermined polymer. The short functionalized carbon nanotubes may be soluble in a variety of aprotic solvents, water, alcohols, and acids. The short functionalized carbon nanotubes may disperse in other materials, for example, polymer composites and monomer blends.

According to some embodiments, an additive for a polymer may include a plurality of short functionalized carbon nanotubes readily soluble in a solvent. The solvent may be selected from among water, alcohols, aprotic solutions, acidic solutions, and combinations thereof. The additive may be soluble at a concentration at least about 10 mg/ml. The average length of the plurality may be less than about 200 nanometers. For example, the average length of the plurality may be less than about 100 nanometers.

According to some embodiments, a process for making an additive for a polymer may include intercalating a plurality of carbon nanotubes with an intercalation agent and reacting the plurality of carbon nanotubes with a reactive agent, where the reactive agent simultaneously reduces the length of the carbon nanotubes and functionalizes the carbon nanotubes. The process may further include dissolving the product of the reacting step in a solvent selected from among water, alcohols, aprotic solutions, acidic solutions, and combinations thereof. The product of the reacting step may include a plurality of short functionalized, carbon nanotubes. According to some embodiments, the intercalation agent is an acid. The acid may be a superacid. The superacid may be oleum. According to some embodiments, the reactive agent is chemically compatible with the intercalation agent. According to some embodiments, the reactive agent is miscible with the intercalation agent. According to some embodiments, the reactive agent includes nitric acid. According to some other embodiments, the reactive agent includes a mixture of sulfuric acid and hydrogen peroxide. According to some other embodiments, the reactive agent includes ozone.

According to some embodiments, a polymer-based composite material includes a polymer and a plurality of short functionalized, carbon nanotubes homogeneously dispersed in the polymer. The polymer may be a thermosetting polymer. For example, the thermosetting polymer may be an epoxy resin. The polymer may be a thermoplastic polymer. The thermoplastic polymer may be Nylon (6,6). The polymer may be a block copolymer. The polymer may be a polyacrylonitrile. The polymer may be a polyamide. The polymer may be a high-temperature polymer. For example, the high-temperature polymer may be poly(p-phenylene benzobisoxazole). The high-temperature may be poly(p-phenylene benzthiazole). The high-temperature polymer may be poly(p-phenylene terapthalamide). The polymer may be a rubber. For example, the rubber may be a nitrile-butadiene rubber. The rubber may be a hydrogenated-nitrile-butadiene rubber. The polymer may be a urethane. The polymer may be a fluoropolymer. The composite material may have improved tensile properties with respect to a comparable material lacking the carbon nanotubes. The composite material may have improved modulus properties with respect to a comparable material lacking the carbon nanotubes.

According to some embodiments, a process for making a polymer-based composite, may include dissolving an additive in a solvent so as to produce a first solution, the additive including a plurality of short functionalized carbon nanotubes, and blending the first solution with a polymer so as to produce a homogeneously dispersed polymer mixture. According to some embodiments, the process further includes curing the polymer mixture. According to some other embodiments, the process further includes extruding the polymer mixture into a fiber. According to some other embodiments, the process further includes casting the polymer mixture into a film. According to some other embodiments, the process further includes molding the polymer mixture into a shaped article. Alternatively or in combination, according to some embodiments, the process includes derivatizing the short functionalized, carbon nanotubes so as to improve solubility in the first solvent and compatibility with the polymer. The derivatizing may be with a nucleophilic material. The nucleophilic material may be ammonia. Alternatively or in combination, the process may include dissolving the polymer resin in a second solvent before the blending step. The second solvent may chemically compatible with the first solvent. The second solvent may be miscible with the first solvent. The first solvent may be selected from among water, alcohols, aprotic solutions, and acidic solutions, and combinations thereof.

According to some of the described embodiments, the carbon nanotubes are single-walled carbon nanotubes (SWNTs).

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF DRAWINGS

The foregoing summary as well as the following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which:

FIGS. 2A, 2B, and 2C are Scanning Electron Microscope (SEM) images of (A) primordial SWNT ropes formed during production, (B) disentangled SWNTs, and (C) short functionalized SWNTs;

FIGS. 6A, 6B, and 6C depict the structures of (A) EPIKURE W curing agent; (B) EPON 862; (C) carboxylated US-SWNTs;

FIG. 7 is typical tensile stress versus strain curves for 1) neat epoxy (solid curve), 2) 0.5 wt % carboxylated US-SWNT/epoxy (dash curve), and (3) 1 wt % US-SWNT/epoxy composites (dash-dot curve);

DETAILED DESCRIPTION OF THE INVENTION

Figure 1:
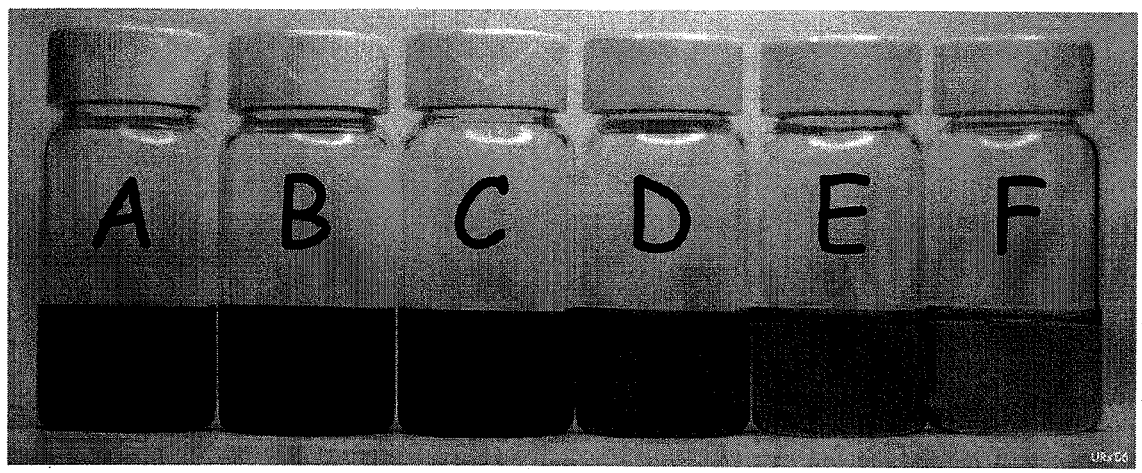
FIG. 1 is a photo of several vials of short functionalized SWNTs dissolved in N-Methyl-2-Pyrrolidone (NMP) at A=500 mg/L, B=250 mg/L, C=125 mg/L, D=62.5 mg/L, E=31.3 mg/L, and F=15.6 mg/L.

The principles of the present invention and their advantages are best understood by referring to FIGS. 1-13 of the drawings, like numerals being used for like and corresponding parts of the various drawings.

In the following descriptions and examples, specific details are set forth such as specific quantities, sizes, etc., to provide a thorough understanding of the present invention. However, it will be obvious to those skilled in the art that the present invention may be practiced without such specific details. In many cases, details concerning such considerations and the like have been omitted inasmuch as such details are not necessary to obtain a complete understanding of the present invention and are within the skills of persons of ordinary skill in the relevant art.

It will be understood that in the description, SWNTs (single-walled carbon nanotubes) are illustrative of carbon nanotubes. Further, it will be understood that in the description that follows, US-SWNTs (ultra-short single-walled carbon nanotubes) are illustrative of short functionalized carbon nanotubes. It will be understood that as used, ultra-short has the same meaning as short, with respect to contemplated lengths, as disclosed. Also, it will be understood that in the descriptions and embodiments are not limited to SWNTs. These descriptions and embodiments are applicable to other carbon materials such as graphene, graphite, and other nanotube materials such as double-walled or multi-walled carbon nanotubes.

In some embodiments, the present invention is directed to processes and products by processes for the chemical and physical modification of SWNTs to alleviate the limited solubility and processiblity of SWNTs due to both the chemical inertness inherent from the SWNT's molecular structure as well as the inevitable entanglement of SWNT "ropes" during production. Due to strong van der Waals attractions, individual SWNTs tend to aggregate into 10-20 nm diameter ropes. The fine, long (up to hundreds of microns in length) ropes, sometimes called "primordial" ropes, tend to entangle into tight networks during production. The entanglement, coupled with SWNT's inherent limited solubility in common solvents, renders untreated SWNT ropes difficult to process into functional articles such as fibers or films, or mixed with other materials such as polymers and other non-polymeric materials, to form composites or polymer blends. Super acids (e.g., >100% sulfuric acids with excess $SO_3$) intercalate in-between individual SWNTs inside the SWNT ropes (Ref. Science 305, 1447 (2004)). The present invention exploits the acid-intercalation phenomenon, especially when the SWNTs have pristine sidewalls.

In some embodiments, the present invention is directed to producing US-SWNTs with a length less than about 200 nm. In some embodiments, the present invention is directed to producing US-SWNTs with a length less than about 100 nm. In some embodiments, the present invention is directed to producing US-SWNTs with a length less than about 50 nm. In some embodiments, the present invention is directed to producing US-SWNTs with end- and sidewall functionalizations that permit the US-SWNTs to dissolve in polar solvents such as NMP, DMSO, and DMI. In some embodiments, the present invention is directed to producing US-SWNTs with end- and sidewall functionalizations that permit the US-SWNTs to dissolve in water. In some embodiments, the present invention is directed to producing US-SWNTs with end- and sidewall functionalizations that permit the US-SWNTs to dissolve in alcohols, such as methanol, ethanol, isopropanol, phenol, and the like. In some embodiments, the present invention is directed to producing US-SWNTs with end- and sidewall functionalizations that permit the US-SWNTs to dissolve in acids, including super-acids such as oleum. In some embodiments, the present invention is directed to producing US-SWNTs with end- and sidewall functionalizations that permit the US-SWNTs to dissolve in polymer or monomer mixtures directly, or solutions thereof. The short functionalized nanotubes may be modified by derivatization so as to produce short functionalized nanotubes with modified functionalizing groups. For example, the derivatization may proceed as disclosed in U.S. patent application Ser. No. 10/470,517, hereby incorporated herein by reference. For example, the derivatizing may be diazonium derivatization. More particularly, the derivatizing may be derivatizing with an aryl diazonium species. Alternatively, the derivatizing may be derivatizing with polyethylene glycol (PEG) or oligoethylene glycol (OEG) moieties via esterification or amidation of some of the short functionalized carbon nanotubes' carboxylic acid moieties with alcohol- or amine-terminated PEG or OEG groups.

In some embodiments, the present invention is directed to processes where US-SWNTs are incorporated into one or more of the following: a thermoset polymer such as an epoxy; a thermoplastic polymer such as Nylon (6,6); a block copolymer such as polyacrylonitriles (PAN); a polyamide; a high temperature polymer such as poly(p-pheylene benzobisoxazole) (PBO), poly(p-phenylene benzthiazole) (PBT), or poly(p-phenylene terapthalamide) (PPTA); a rubber such as nitrile-butadiene (NBR) or hydrogenated-nitrile-butadiene (HNBR); a urethane; a fluoropolymer; or other materials as long as they are soluble in a common solvent, and form composites and blends with US-SWNTs.

In some embodiments, the present invention is directed to a process and products of the process wherein US-SWNTs are co-dissolved in monomer(s) or polymer(s), and other ingredients such as curing agents, in a common solvent; in some embodiments the said US-SWNT/polymer solution is then shaped by being extruded through a spinneret, or a film die, or being cast into a mold; the solvent of the shaped solution removed by evaporation or direct coagulation at appropriate conditions using appropriate apparatus or a combination thereof; in some embodiments, the solvent of the said US-SWNT/polymer solution is being removed and then shaped; in some embodiments, the shaped articles, fibers or films or 3-D parts, where the polymers are then cured (i.e., cross-linked) following an appropriate procedure known to one of ordinary skill in the art; in some embodiments, the shaped articles are then dried and heat-treated at elevated temperature in an appropriate atmosphere; in some embodiments, the shaped articles are converted to a final material through appropriate conditioning and high-temperature treatments.

In some embodiments, the present invention is directed to methods of simultaneously shortening and functionalizing SWNTs to create US-SWNTs, such methods containing some or all of the following parts: In some embodiments, dispersing disentangled SWNTs, or purified SWNTs, or raw SWNTs, which should have pristine side-walls, in any acid (or chemical agents) capable of intercalating SWNT ropes, such as sulfuric acid with excess $SO_3$—intercalation of sulfuric acid or other suitable intercalant between individual SWNT ropes providing access for a cutting and shortening agent to the individual SWNTs; in some embodiments, introduction of a cutting and functionalization agent, such as nitric acid or other suitable reagents, which are chemically compatible and miscible with the intercalating and dispersing acids, shortens and functionalizes the SWNTs, wherein the cutting and functionalization process is carried out at or between about room temperature and 100° C. for the duration of about a few minutes to several hours; in some embodiments, the coagulation, washing, neutralization and drying of the resultant product. In some embodiments, the present invention is directed to producing US-SWNTs with a length less than about 200 nm. In some embodiments, the present invention is directed to producing US-SWNTs with a length less than about 100 nm. In some embodiments, the present invention is directed to producing US-SWNTs with a length less than about 60 nm. In some embodiments, the present invention is directed to producing US-SWNTs with a length less than about 50 nm. In some embodiments, the present invention is directed to producing US-SWNTs with a length between about 20 nm and about 30 nm. In some embodiments, the present invention is directed to producing US-SWNTs with end- and sidewall functionalizations that permit the US-SWNTs to dissolve in polar solvents, such as NMP, DMSO, DMF, DMAc, DMI, and similar solvents. In some embodiments, the present invention is directed to producing US-SWNTs with end- and sidewall functionalizations that permit the US-SWNTs to dissolve in alcohols, such as methanol, ethanol, isopropanol, phenol, and the like. In some embodiments, the present invention is directed to producing US-SWNTs with end- and sidewall functionalizations that permit the US-SWNTs to dissolve in water. In some embodiments, the present invention is directed to producing US-SWNTs with end- and sidewall functionalizations that permit the US-SWNTs to dissolve in acids, including super-acids such as oleum.

In some embodiments, the US-SWNTs are processed with reagents to produce US-SWNTs with end- and sidewall functionalizations that permit the US-SWNTs to dissolve in polymer or monomer mixtures directly, or solutions thereof.

In some embodiments, the present invention is directed to incorporating US-SWNTs into polymers or into other materials, such as monomers, in which both the US-SWNTs and the material are soluble, such as polar solvents, water, alcohols, or acids, or solutions thereof, the process containing some or all of the following parts: Co-dissolving the US-SWNTs with the polymers or other materials in a common solvent to disperse the US-SWNTs in the polymers or other materials, or directly dissolving the US-SWNTs in the polymer materials; in some embodiments, shaping the solution through a film die or spinneret or a casting mold; in some embodiments, coagulating the shaped solution in a coagulation bath, or consolidating the shaped solution in a forced-air oven, or a vacuum oven at appropriate temperature through the evaporation of the solvent; in some embodiments, provide a post-treatment of the shaped articles such as cross-linking, annealing, heat treating, pressure moldings to further enhance the properties of the shaped article.

In some embodiments, the present invention is directed to incorporating US-SWNTs into thermoset resin and forming a US-SWNT/thermoset polymer, which is tougher and more rigid than the neat thermoset polymer while maintaining the ease of processibility of the matrix resin. In some embodiments, the present invention is directed to incorporating between 0.001 wt % to 20 wt % US-SWNTs in a thermosetting resin. In some embodiments, the present invention is directed to incorporating less than 10 wt % US-SWNTs in a thermosetting resin. In some embodiments, the present invention is directed to incorporating less than 5 wt % US-SWNTs in a thermosetting resin. In said embodiments, a resin, including an epoxy resin, includes but is not limited to those epoxy resins listed in Table 5.1 of *Handbook of Composites* (Edited by George Lubin, 1981). In said embodiments, an appropriate stoichiometric amount of curing agent is used, and includes but is not limited to such curing agents as listed in Section 5.4 of *Handbook of Composites*.

In some embodiments, the present invention is directed to processes involving one or more of the following: Co-dissolving an appropriate amount of US-SWNTs with a thermosetting resin and an appropriate curing agent for the resin in a solution, such as an aprotic solvent, to form a solution wherein the US-SWNTs are homogeneously dispersed; in some embodiments, evaporating the solvent by a roto-evaporator or a vacuum oven at room temperature or at low enough temperature to prevent premature reaction and curing between the components until most of the solvent is evacuated; in some embodiments, where the viscosity of the remaining liquid US-SWNT/thermosetting resin/curing agent mixture is undesirably high, adding an amount of reactive diluents, including diluents listed but is not limited to those listed in Table 5.2 in *Handbook of Composites*, to the mixture to lower its viscosity; in some embodiments, shaping the remaining US-SWNTs/thermosetting resin/curing agent mixture by pouring it into a casting mold made of a material such as but not limited to silicon rubber or a metallic material; in some embodiments, evacuating the mixture in the shaping mold in a vacuum oven at an appropriate temperature to prevent premature curing or a reaction from happening until the residual solvent is removed; in some embodiments, curing the mixture in the mold according to a thermosetting resin curing procedure known to one of ordinary skill in the art; in some embodiments, post-curing the resultant product to further enhance the properties of the article.

In some embodiments, the present invention is directed to processes for making a composite fibers or films by incorporating US-SWNTs into a mixture of polymer precursors with compositions ranging from 1/99 wt/wt % to 99/1 wt/wt % US-SWNTs/precursor polymers, in processes containing some or all of the following parts: Co-dissolving the US-SWNTs with the polymer precursors in a solvent; in some embodiments, shaping the solution by extrusion the solution through a spinneret or film die; in some embodiments, coagulating the shaped solution in a coagulation bath of appropriate compositions with optimum coagulation rate or consolidating the shaped solution in a forced-air oven or a vacuum oven at appropriate temperature through the evaporation of the solvent—it is generally understood to one of ordinary skill in the art that there is an air-gap of various length between the exit of the spinneret or the shaping die and the top surface of the coagulation bath and that the speed of the take-up roll (drum) is higher than the linear extrusion rate of the polymer solution, the ratio between the take-up speed and the extrusion rate being called the spin-draw ratio (SDR), which is preferred to be as high as possible for the greatest possible axial orientation of the composite fibers or films; in some embodiments, providing a series of post-treatments of the shaped articles such as but not limited to wet-drawing to further the axial orientation of the fibers or films, washing and drying to eliminate the residual solvent, oxidation at moderately high temperatures to convert the US-SWNT/polymer product into a US-SWNT/oxidized polymer product, carbonization at elevated temperatures to convert the US-SWNT/oxidized polymer into a carbon/carbon composite fibers, annealing, heat treating, or pressure moldings the resultant product to further enhance the properties of the shaped articles.

In some embodiments, the present invention is directed to processes for making composite fibers or films by incorporating US-SWNTs into high temperature (HT) polymers—polymers generally refer to as those polymers which do not show a glassy transition temperature and/or melting temperature before their decomposition at elevated temperature—such as PBO or PPTA—or other aromatic polyamides, or other high temperature polymers with compositions ranging from 1/99 wt/wt % to 99/1 wt/wt % US-SWNT/HT polymers, in processes containing some or all of the following parts: Co-dissolving the US-SWNTs with the polymer precursor in an acidic solvent, such as but not limited to sulfuric acid, polyphosphoric acid (with or without $P_2O_5$ contained therein), methanesulfoinc acid (MSA), chlorosulfonic acid or other strong acids, or a super acid, such as but not limited to oleum; in some embodiments, shaping the solution by extruding the solution through a spinneret or film die into a coagulation bath with or without an air-gap and with maximum SDR; in some embodiments, coagulating the shaped solution in a coagulation bath of appropriate compositions at an optimum coagulation rate known to one of ordinary skill in the art; in some embodiments, washing and drying, usually under tension, to rid the residual acids or solvent from the product material; in some embodiments, annealing or heat treating the resultant product under tension to further enhance the properties of the shaped articles.

The following examples are included to demonstrate particular embodiments of the present invention. It should be appreciated by those of skill in the art that the methods disclosed in the example that follows merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE NO. 1

This Example serves to illustrate a SWNT cutting and functionalization process and the resulting product, in accordance with some embodiments of the present invention.

The US-SWNTs produced according to the processes described in this Example dissolved spontaneously in polar aprotic solvents (e.g., NMP and DMSO) in concentrations of at least 1 wt % in aprotic solvents and at least 2% in water. Comparative tests of uncut, disentangled SWNTs and the US-SWNTs made in the Example in water showed spontaneous dissolution of the US-SWNTs, unlike the disentangled SWNTs. A US-SWNT/water solution was found to be very stable in open atmosphere. FIG. 1 demonstrates a series of US-SWNT/NMP solutions at various product US-SWNT concentrations.

SWNTs produced by the well-known HiPco process (*J. Vac. Sci. & Tech. A-Vac. Surf. & Films* 2001, 19, 1800-1805) were used. The first step was to ensure that all primordial SWNT ropes, inevitably formed during their production and processing of the starting materials, were intercalated with a super acid (e.g., >100% sulfuric acid). The purpose for adding the super-acidic medium to the SWNT ropes was to open up pathways between individual SWNTs inside the SWNT ropes so that the cutting and functionalization agent(s) could access the individual SWNTs instead of the outer surface of the bulk, tangled, primordial, SWNT ropes, thereby making the cutting and functionalization more efficient and more uniform. For the intercalation to be most effective, it was determined that the D/G ratio (intensity ratio of distortion band and G-band of the Raman spectrum) of the SWNT needed to be as low as possible. In this example, 400 mg purified, dry, disentangled SWNTs (with a D/G ratio of 1/33) were dispersed in 200 ml oleum (120% sulfuric acid) in a sealed glass container. The resulting SWNT dispersion was stirred with a magnetic stirrer overnight at room temperature. FIGS. 2A and 2B are SEM images of (A) primordial SWNT ropes and (B) disentangled SWNTs.

The second step was the introduction of the cutting and functionalization agent, such as $HNO_3$ or $O_3$ or a $H_2SO_4$: $H_2O_2$ mixture or other suitable reagents, into the SWNT dispersion. In this example, a 100 ml:100 ml concentrated 120% oleum:70% $HNO_3$ mixture was slowly added into the SWNT/oleum dispersion while stirring in an ice bath.

The third step was to allow adequate time for the cutting and functionalization agent to perform its work on the intercalated SWNTS. In this example, the sealed container with the SWNT/acid dispersion was immersed in a 60° C. oil bath for 2 hours while stirring was maintained.

The fourth step was to coagulate, wash, neutralize, and filter the resultant US-SWNTs. The dispersion was diluted with 1.2 liters of water treated by a NANOpure Infinity® (Barnstead Internationals, Dubuque, Iowa) unit while immersed in an ice bath. The resulting dark solution was filtered over a 0.22 μm polycarbonate membrane and coagulated with a 200 ml mixture of ethyl ether with small amount of MeOH. The dark mixture was coagulated and washed with ethyl ether several times until the mixture became acid-neutral. The filtered US-SWNTs were vacuum dried at room temperature overnight.

The product US-SWNTs had a D/G ratio of 1/1.06, indicating a high level of functionalization on the side-walls. FIG. 2C is a SEM image of functionalized, ultra-short SWNTs as produced according this Example.

Figure 3A:
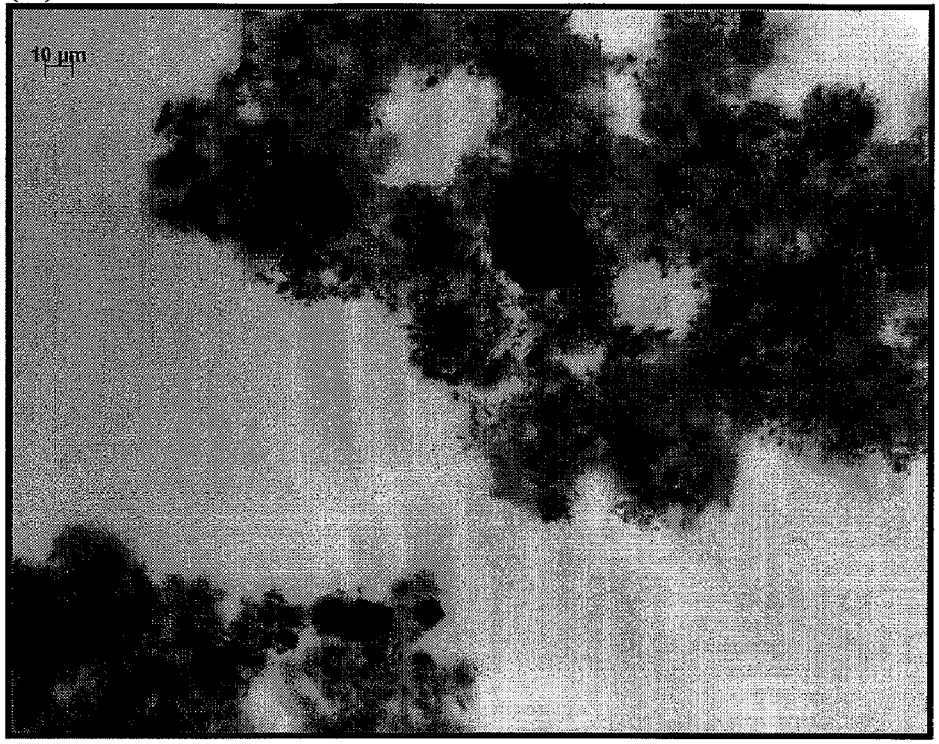
FIGS. 3A and 3B are optical microscopy images of 0.5 wt % (A) disentangled and (B) short and functionalized SWNT in NMP.
Figure 3B:
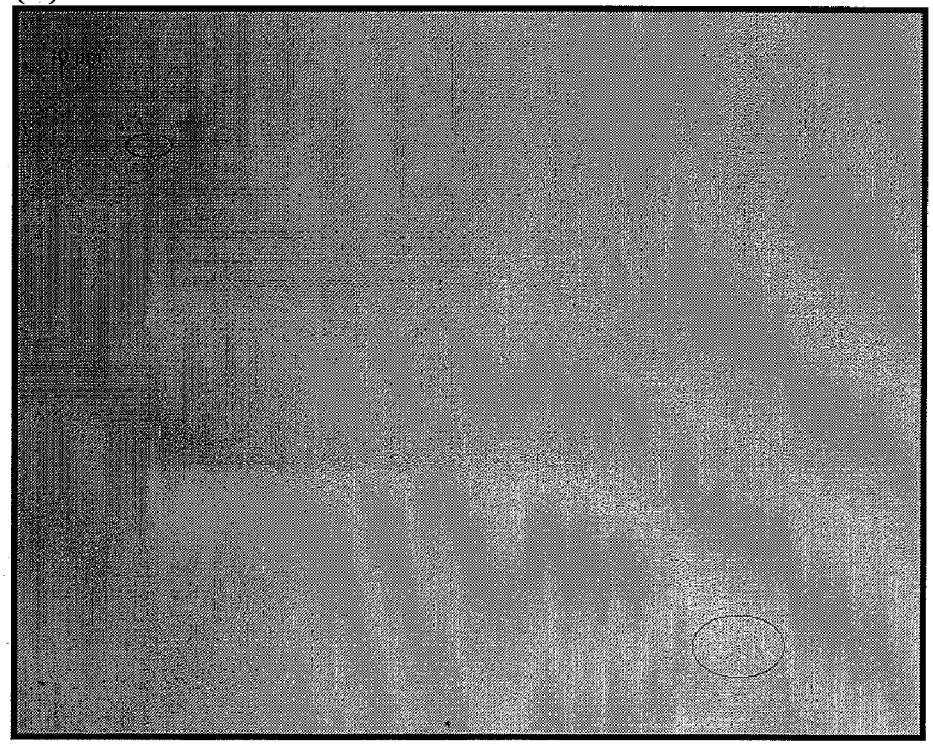

A ZEISS Axioplan2 optical microscope was used to examine the dispersity of US-SWNTs in various solvents and mixtures. Optical microscopy showed a significant difference between the disentangled SWNTs and the US-SWNTs of the Example. FIGS. 3A and 3B are images of 0.5 wt % (A) disentangled and (B) nitric acid-treated US-SWNTs in NMP. In sharp contrast to the particulate aggregates of disentangled SWNT in NMP, the US-SWNT figure shows a homogeneous solution with very few visible particles.

Figure 4A:
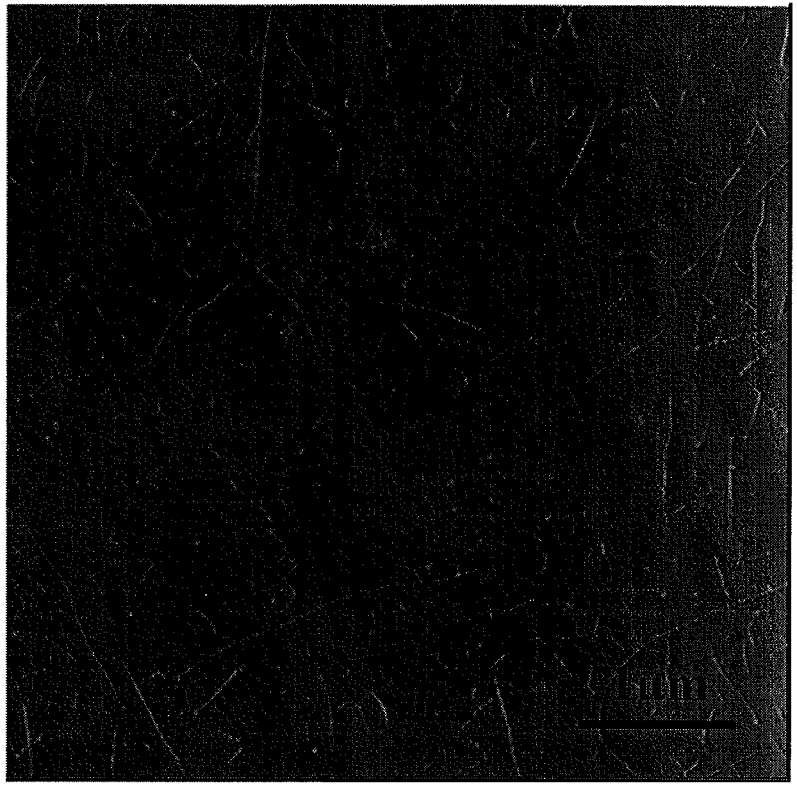
FIGS. 4A and 4B are Atomic Force Microscopy (AFM) images of (A) disentangled and (B) short and functionalized SWNT.
Figure 4B:
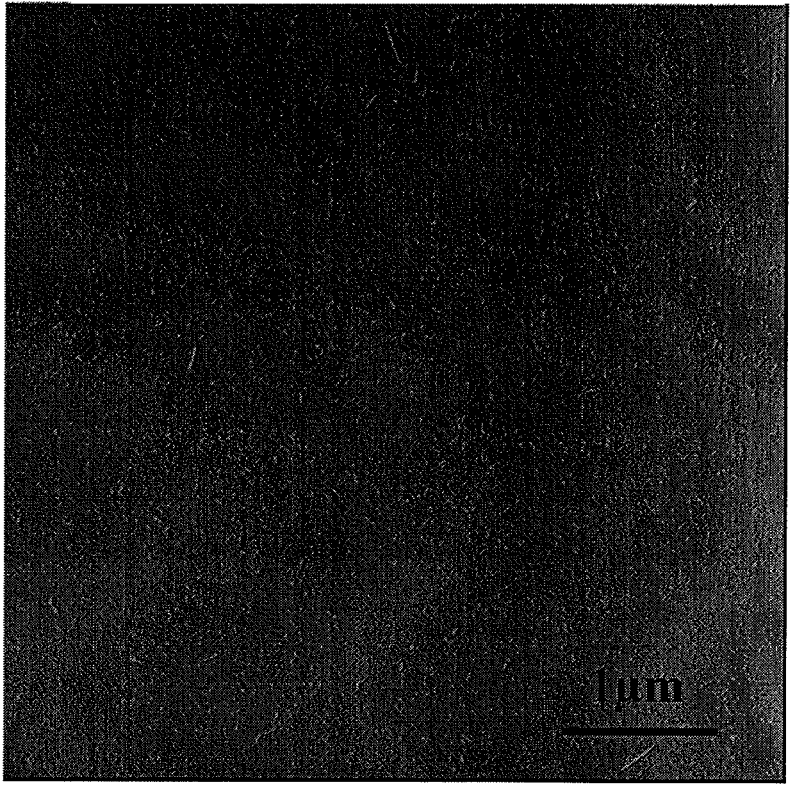

AFM images obtained on a tapping mode Nanoscope III indicated the shortening of the SWNTs after nitric acid treatment. The disentangled SWNT sample needed to be alkylated in lithium/liquid ammonia at dry ice/acetone temperatures in order to show individual SWNTs in chloroform and to be spun-coated onto mica wafers. An AFM image of these SWNTs is shown in FIG. 4A. In contrast, the AFM image of the US-SWNT was obtained by directly spin-coating a diluted US-SWNT/water solution onto mica, as shown in FIG. 4B. The US-SWNT/water solution reproducibly exhibited mostly short, individual SWNTs from height measurements.

Figure 5:
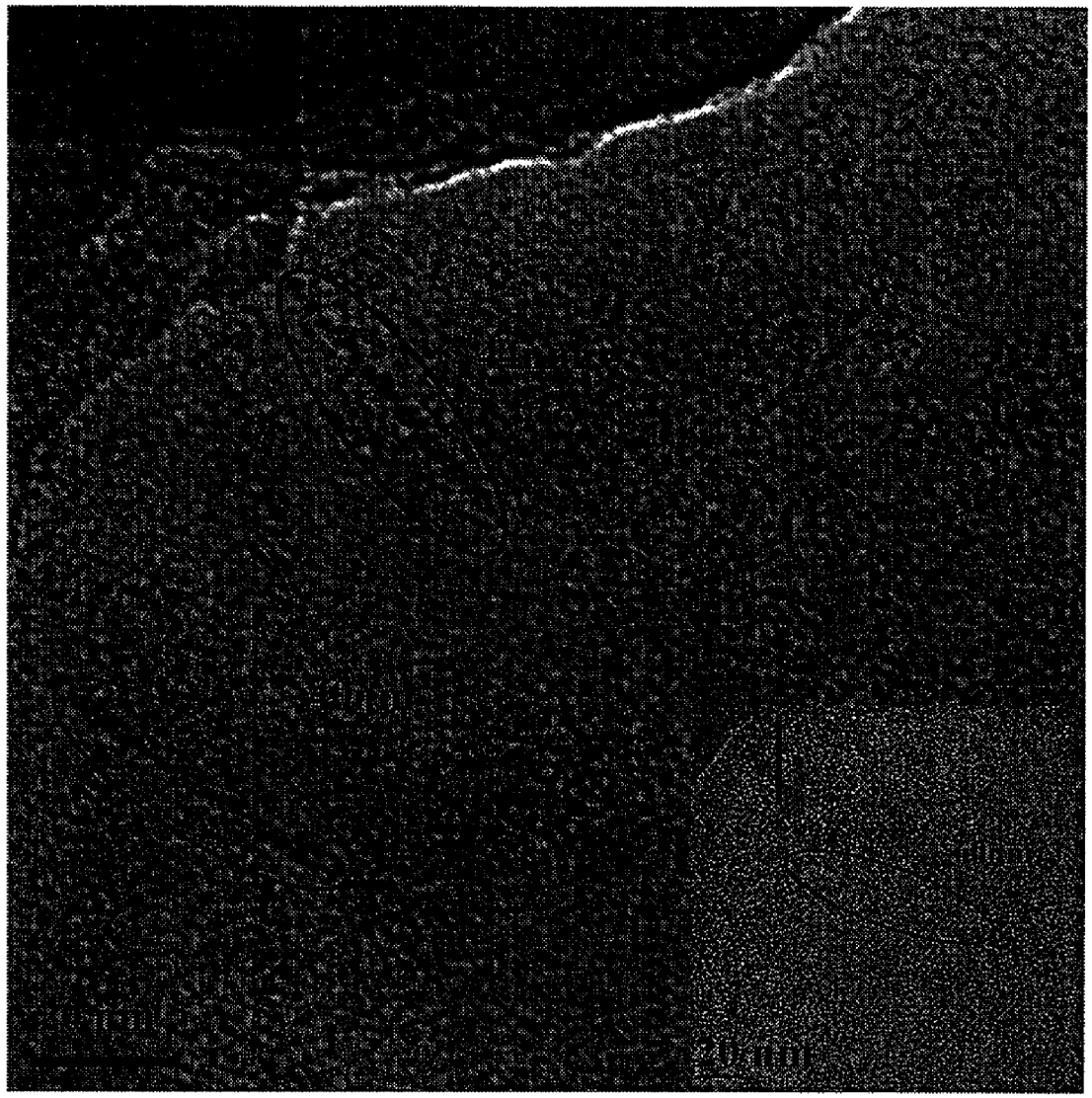
FIG. 5 is a Transmission Electron Microscopy (TEM) image of ultra-short SWNT (US-SWNT)

FIG. 5 shows a preliminary TEM of the resultant product. The length of the US-SWNTs made by the process were about less than 60 nm, and, on average, about 20-30 nm in length.

Raman spectra of the US-SWNT sample showed a RBM between 200 cm-1 and 300 cm-1, a disorder mode at 1295 cm-1, and a tangential mode at 1592 cm-1. In comparison to disentangled SWNTs and shortened raw SWNTs, shortened disentangled SWNTs (US-SWNTs) have much higher D/G ratios. The comparison indicated that there are many functional groups chemically bonded to the sidewalls of the US-SWNT sample. A magnified RBM mode examination of the US-SWNT samples revealed the disappearance of the "roping" mode peak at 260 cm-1 after the cutting and functionalization process, indicating that US-SWNTs no longer rope-up as seen in FIG. 2C in contrast to normal-length SWNTs as shown in FIGS. 2A and 2B.

X-ray photon-electron spectroscopy (XPS) of the US-SWNTs revealed the existence of covalently bonded carboxylic groups (—COOH, binding energy ~288 eV) and carbonyl groups (—C=O, binding energy ~286 eV) on the ends and sidewalls after treatment. Elemental analysis of the resultant sample showed a stoichiometry of C2.78 (—OOH) (—OC$_2$H$_5$) and a 30% carbon yield, which was in agreement with thermal gravimetric analysis (TGA) results for the sample. It is believed, therefore, that the US-SWNTs bear many functional groups, such as carboxylic acids and carbonyl groups, on the sidewalls and ends of the shortened carbon nanotube. Fourier transform infrared (FTIR) spectrum analysis verified the existence of COOH and C=O group on the US-SWNTs.

By varying the concentration of the reagents, type of reagents, temperature, and the duration of reaction, one can vary the resultant SWNT's level of functionalization, type of functionalization, and length. As discussed, the characterizations of the resultant SWNT prove that they are short, highly carboxylated, SWNTs which, due to their size and functionality, dissolve readily in solvents such as aprotic solutions, alcohols, acidic solutions, and water.

EXAMPLE NO. 2

This Example serves to illustrate a US-SWNT/epoxy composites process and resulting product, in accordance with some embodiments of the present invention.

The epoxy resin used in the present study was a diglycidyl ether of bisphenol F (DGEBF), designated as EPON 862 resin (Hexion Specialty Chemicals, Columbus, Ohio), a structural resin widely used in commercial aircraft construction. The resin was used with a commercial aromatic diamine curing agent: EPIKURE W. The structures of EPIKURE W curing agent, EPON 862, and US-SWNT are represented in FIGS. 6A-C, respectively.

An US-SWNT/epoxy composite material was created. A US-SWNT sample was made by the process described in Example No. 1, resulting in a US-SWNT material with a size <60 nm. The amount of epoxy resin and curing agent needed for 1 wt % US-SWNTs was calculated with the following equations:

$$\frac{0.1}{x+y+0.1} = 0.01 \quad \text{(Eq. 1)}$$

$$\frac{2x}{337.6464} = \frac{4y}{178.2773} - \frac{0.1}{z}$$

In Equations 1, x is the mass of epoxy resin, y is the mass of the curing agent, and z is the molecular weight of equivalent US-SWNTs based on stoichiometry determined by XPS data. The following example used the recipe based on the stoichiometry of one carboxylic acid group for every 4.57 SWNT carbons.

Using the aforementioned materials, a 1:99 wt:wt US-SWNTs:epoxy composite was created in a series of steps. 0.1 g of US-SWNTs was dissolved in 21 ml (about 20 g) of DMF at room temperature in a round-bottom flask under continuous stirring overnight. About 7.8 g of EPON 862 resin and about 2.1 g of EPIKURE W were added to the US-SWNTs/DMF solution and stirred for 1 hour to achieve a homogeneous solution. The solvent was removed and the remaining solution degassed at 30° C. by vacuum rotary evaporation set at 100 RPM and 0.08 torr. A cooling condenser was used and set at −15° C. until about 0.75 g DMF (weight by balance) remained in the mixture. The US-SWNT/epoxy mixture was cast into a silicone rubber dog bone-shaped mold and a strip mold (2 mm×10 mm×50 mm). The molds were set to vacuum dry at 3×10⁻³ torr at room temperature overnight to remove most of the residual DMF. The mixture was cured in the molds at 177° C. for 2.5 hours.

The resultant samples were then prepared for tensile and DMA testing. For mechanical testing, the samples were polished using sand paper (400X) to obtain uniform cross sections. Tensile testing was performed on an INSTRON 4505 with a 5 kN load cell and 5 mm/min crosshead speed. The tensile properties of neat epoxy and the US-SWNTs/epoxy composite were determined following the ASTM D638 protocol. DMA testing was performed on PerkinElmer Instrument Pyris Diamond DMS. The storage modulus of strip samples was determined at room temperature.

Table 1 lists the average tensile properties of US-SWNT/epoxy composites versus a neat epoxy sample made simply of the EPON 862/EPIKURE W agents. Comparatively, the 0.5: 99.5 US-SWNTs:epoxy composite sample showed an average of about 13% increase in Young's modulus and an average of about 54% increase in toughness versus the neat epoxy standard. Similarly, there was a average of about 17% increase in Young's modulus and an average of about 46% improvement in toughness for the 1:99 US-SWNTs:epoxy composite sample versus the neat epoxy standard. Both composites had a higher elongation-to-break than neat epoxy.

TABLE 1

Average tensile properties of US-SWNT/epoxy composites and neat epoxy.

| Sample | Young's Modulus (GPa) | Tensile Strength (MPa) | Elongation to Break (%) | Toughness (MPa) |
|---|---|---|---|---|
| EPON 862/EPIKURE W | 2.05 | 71.38 | 8.0 | 3.5 |
| 0.5 wt % US-SWNTs in epoxy | 2.31 | 84.30 | 9.6 | 5.4 |
| 1 wt % US-SWNTs in epoxy | 2.40 | 85.12 | 8.9 | 5.1 |

Table 2 lists the average storage modulus of US-SWNT/epoxy composite samples from DMA testing. The results show an average increase of about 15%-20% in rigidity (i.e., storage modulus) of both composites samples with low loading.

TABLE 2

Average storage modulus of US-SWNT/epoxy composites and neat epoxy from DMA testing.

| Sample | EPON 862/EPIKURE W | 0.5 wt % US-SWNTs | 1 wt % US-SWNTs |
|---|---|---|---|
| Storage Modulus (GPa) | 2.53 | 2.9 | 3.05 |

FIG. 7 shows typical tensile stress versus strain curves for 1) neat epoxy (solid curve), 2) 0.5 wt % US-SWNTs/epoxy (dash curve), and (3) 1 wt % US-SWNTs/epoxy composites (dash-dot curve).

Figure 8:
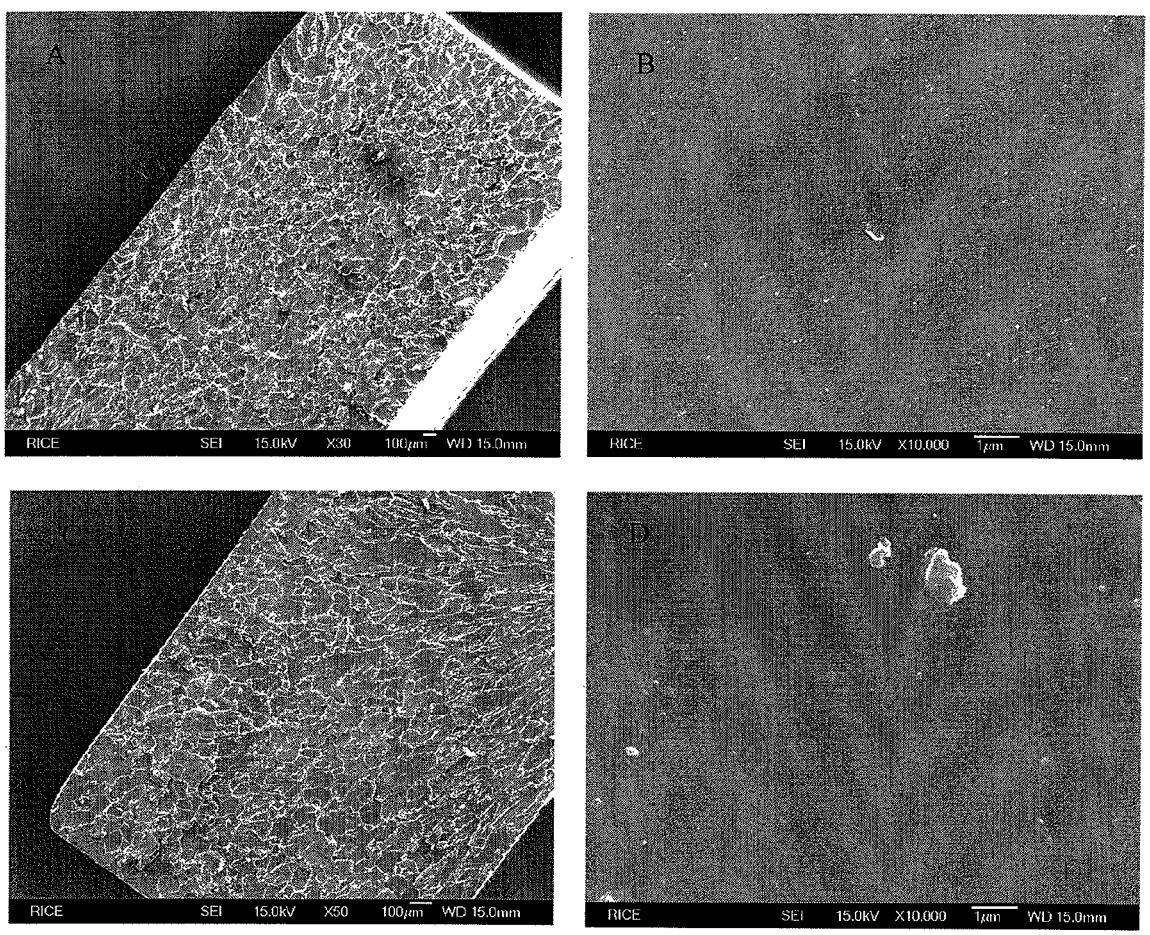
FIG. 8 are SEM images of the fracture surfaces of (A) and (B) EPON 862/EPIKURE W neat epoxy polymer and (C) and (D) 1 wt % US-SWNTs/epoxy polymer composite.

FIG. 8 shows SEM images of the fracture surfaces of both the neat epoxy and the US-SWNT/epoxy composite. FIGS. 8A and 8B show the fracture surface of neat epoxy, whereas FIGS. 8C and 8D show the fracture surface of the US-SWNT/epoxy composite. The images reveal that there is no difference between the fracture surfaces of the 1 wt % US-SWNT/epoxy composite and the neat epoxy. Additionally, no discernible phase separation between the homogeneously US-SWNT and the matrix epoxy material can be observed. These images imply that US-SWNTs may be individually, or molecularly, dispersed in the epoxy matrix similar to a "rigid rod" molecular composite. Such a dispersion is believed to contribute to the enhanced mechanical properties observed.

It is believed that direct bonding between the US-SWNT and the epoxy matrix material occurred in the sample material created. The chemistry of the US-SWNTs/epoxy during curing was postulated to be amide (—CONH—) and ester (—COO—) formation between the carboxylic acid groups of the US-SWNTs, the amino groups of the curing agent EPIKURE W, and the epoxy groups of EPON 862, respectively. The amide formation between EPIKURE W and US-SWNT at 1650 cm⁻¹ could not be consistently detected in the IR spectra of the US-SWNTs-epoxy samples due to the low loading of US-SWNTs. However, model reactions conducted support the suggestion.

Figure 9:
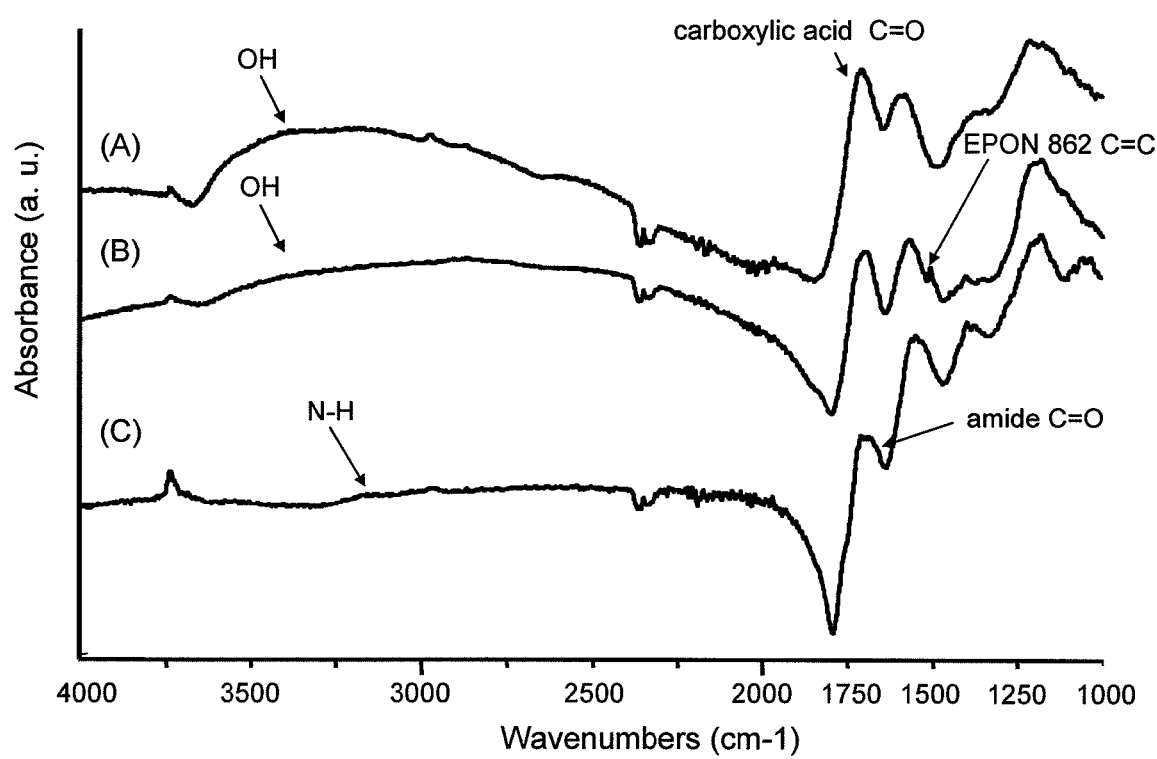
FIG. 9 is ART-IR spectra of (A) US-SWNT, (B) US-SWNT-EPON 862 product, and (C) US-SWNT-EPIKURE W product.
Figure 10:
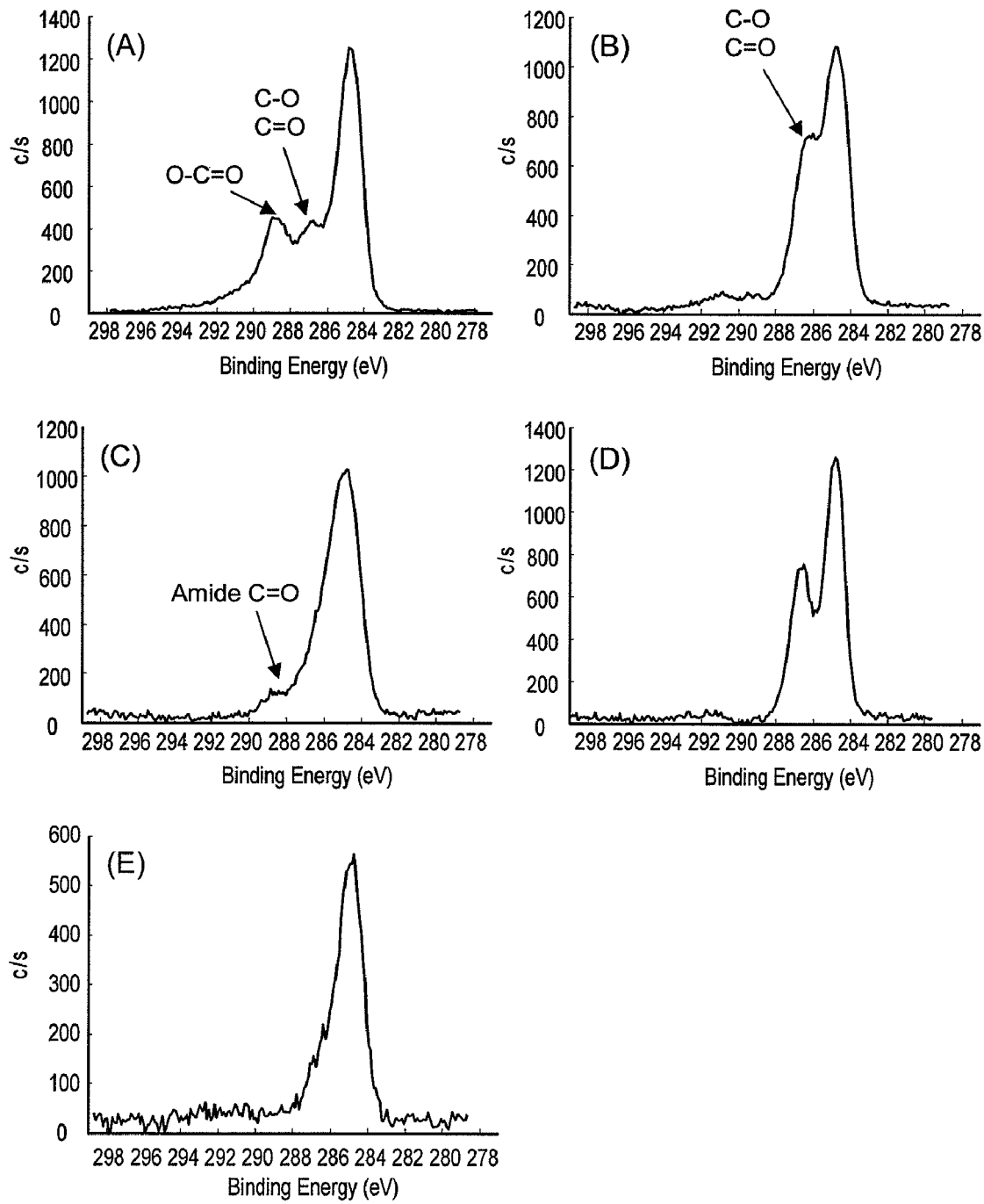
FIGS. 10A-E depict XPS spectra of (A) US-SWNT, (B) US-SWNT-EPON 862 product, (C) US-SWNT-EPIKURE W product, (D) EPON 862, and (E) EPIKURE W.

FIG. 9 shows the ATR-IR spectra of US-SWNTs before and after functionalization with EPON 862 and EPIKURE W. Curve (A) of FIG. 9 represents the spectra of US-SWNTs before functionalization. Curve (B) represents the product of functionalization between the US-SWNTs and EPON 862. Curve (C) represents the product of functionalization between US-SWNTs and EPIKURE W. The functionalization process occurred at the same conditions as the curing of the US-SWNT/epoxy composite. The carboxylic acid stretch in Curve (A) in FIG. 9 is observed at 1710 cm$^{-1}$ due to the high degree of carboxylation of US-SWNTs. The peak around 1700 cm$^{-1}$ in Curve (B) of FIG. 9 may be assigned to the C=O stretch of the ester formed after ring opening of the epoxide ring with the COOH groups of US-SWNTs. The asymmetric C—O—C stretch absorption peak at 1210 cm$^{-1}$ in Curve (B) is characteristics of ether functionality both from the aliphatic ether group and epoxide group of EPON 862. The peak at 1500 cm$^{-1}$ in Curve (B) is assigned to the C=C ring stretch of phenyl groups in EPON 862, which was not detected before the functionalization reaction. The absorptions at 1580 cm$^{-1}$ are from C=C stretching mode of the nanotubes. These results indicate ester formation between the COOH groups on the US-SWNTs and epoxy groups of EPON 862. For the US-SWNTs functionalized with EPIKURE W as shown in Curve (C), characteristic amide and amine absorption bands are observed at 3100-3300 cm$^{-1}$ (N—H stretch) and 1680 cm$^{-1}$ (C=O amide stretch) overlapping with the C=O carboxylic acid peak at 1710 cm$^{-1}$. Previously reported direct thermal amidation of nanotubes with amine groups support the results.

The XPS C 1s spectra shown in FIGS. 10A-E of US-SWNT functionalized with EPIKURE W or EPON 862 show a significant decrease in the O=C—O carboxylic acid peak at 289 eV compared to US-SWNT, as shown in FIG. 10A. The high degree of carboxylation after the cutting of SWNTs is evident in the XPS C 1s spectra in FIG. 10A. After functionalization of US-SWNT with EPON 862, FIG. 10B representing the product shows a peak centered at 289 eV that was not seen and a corresponding increase in intensity centered at 287 eV peak. This is attributed to the C=O, C—O for ester and hydroxyl groups resulting from the reaction between the carboxylic acid groups and epoxide groups of EPON 862 as well as the ether group present in EPON 862. FIG. 10D shows a spectra of pure EPON 862 for comparison. These results indicate the covalent bonding between epoxy rings of EPON 862 and COOH groups on US-SWNT. US-SWNT functionalized with EPIKURE W, as shown in FIG. 10C, displays residual carboxylic acid peak at 289 eV overlapping with the amide signal at ~288 eV. FIG. 10E shows a spectra of pure EPIKURE W for comparison. The US-SWNT functionalized with EPIKURE W showed nitrogen content of 9%.

EXAMPLE NO. 3

This Example serves to illustrate a US-SWNT/Nylon (6,6) composites process and resulting product, in accordance with some embodiments of the present invention.

A US-SWNT/Nylon (6,6) composite material was created. About 4.75 grams of Nylon (6,6) was dried at 50° C. under vacuum overnight to remove any absorbed moisture. Nylon material was completely dissolved in about 75 ml MSA while being magnetically stirred in a 250 ml sealed round bottle flask. About 250 mg of US-SWNT, prepared as described in Example No. 1, was dissolved first in about 50 ml MSA by magnetic stirring overnight in a sealed 250 ml round bottle flask. The US-SWNT/MSA solution was blended with the Nylon (6,6)/MSA solution through 1 minute of high speed homogenizing (10000 rpm). After high-speed blending, the mixture was immediately coagulated with ice:water (5:1 vol: vol) treated with a NANOpure Infinity® unit while continuing high-speed sheer homogenizing (10000 rpm) for an additional minute. The resultant mixture was filtered through a 5 μm Teflon® (E. I. Du Pont De Nemours, Wilmington, Del.) membrane with a Büchner fitted disk funnel. The resulting "black slush" was washed with treated water until neutral in pH, and then with a 50 ml methanol:300 ml ethyl ether mixture several times to dry the sample. The partially dried sample was stirred in a beaker on a hot plate at 50° C. to remove most of the solvents and then vacuum dried at 50° C. overnight.

The resultant gray powder mixture appeared upon observation to be homogenous. The resultant material was then ground into a fine powder for injection molding by using a MICRO-MILL® grinder (Bel-Art Products, Pequannock, N.J.). The ground US-SWNT/Nylon (6,6) powder was injected using an injection molder into strips (2 mm thickness×10 mm width×50 mm length) and dog bone shapes (ASTM D638 Standard) at 290° C. The mold temperature was set at 70° C. A releasing agent was used to help the release of specimen out of the metal molds.

Figure 11:
FIGS. 11A, 11B, and 11C are SEM images of the fracture surfaces of (A) neat Nylon (6,6) and (B) and (C) US-SWNT/Nylon (6,6) composite.

FIG. 11 show SEM images of the surfaces of both a neat Nylon (6,6) sample in FIG. 11A and a US-SWNT/Nylon (6,6) composite sample in FIGS. 11B and 11C. The images show no obvious US-SWNT structures on the surface of the article in comparison to the neat Nylon (6,6).

Figure 12:
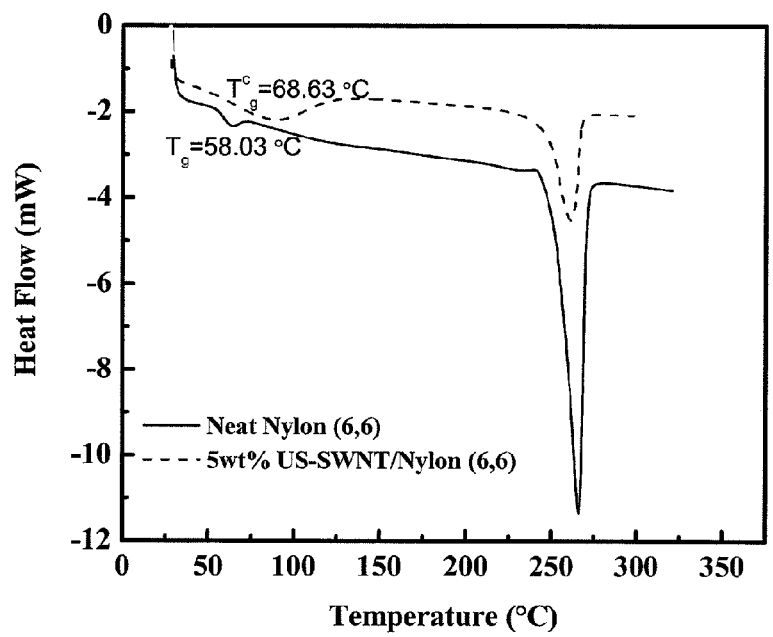
FIG. 12 is Differential Scanning Calorimetry (DSC) of neat Nylon (6,6) (solid curve) and US-SWNT/Nylon (6,6) composite (dashed curve)

FIG. 12 shows the result of a Differential Scanning Calorimetry (DSC) test using a TA Q10 DSC of both the US-SWNT/Nylon composite and neat Nylon sample. The test shows an average increase in the glass transition temperature (Tg) for the US-SWNT/Nylon (6,6) composite. The Tg of the neat Nylon sample averaged to 58.03° C., whereas the Tg of the US-SWNT/Nylon composite sample averaged to 68.63° C. Back calculation using the Fox equation $$\left( \frac{1}{Tg} = \frac{M_m}{Tg^m} + \frac{M_f}{Tg^f} \right)$$

revealed the Tg of the sample US-SWNTs to be theoretically around 250° C.

Dynamic Mechanical Analysis (DMA) was performed on a PerkinElmer Instrument Pyris Diamond Dynamic Mechanical Analyzer. The room temperature storage modulus showed a consistent increase in modulus with US-SWNT loading. One result showed a 36% increase in modulus for 5 wt % US-SWNT/Nylon (6,6).

Figure 13:
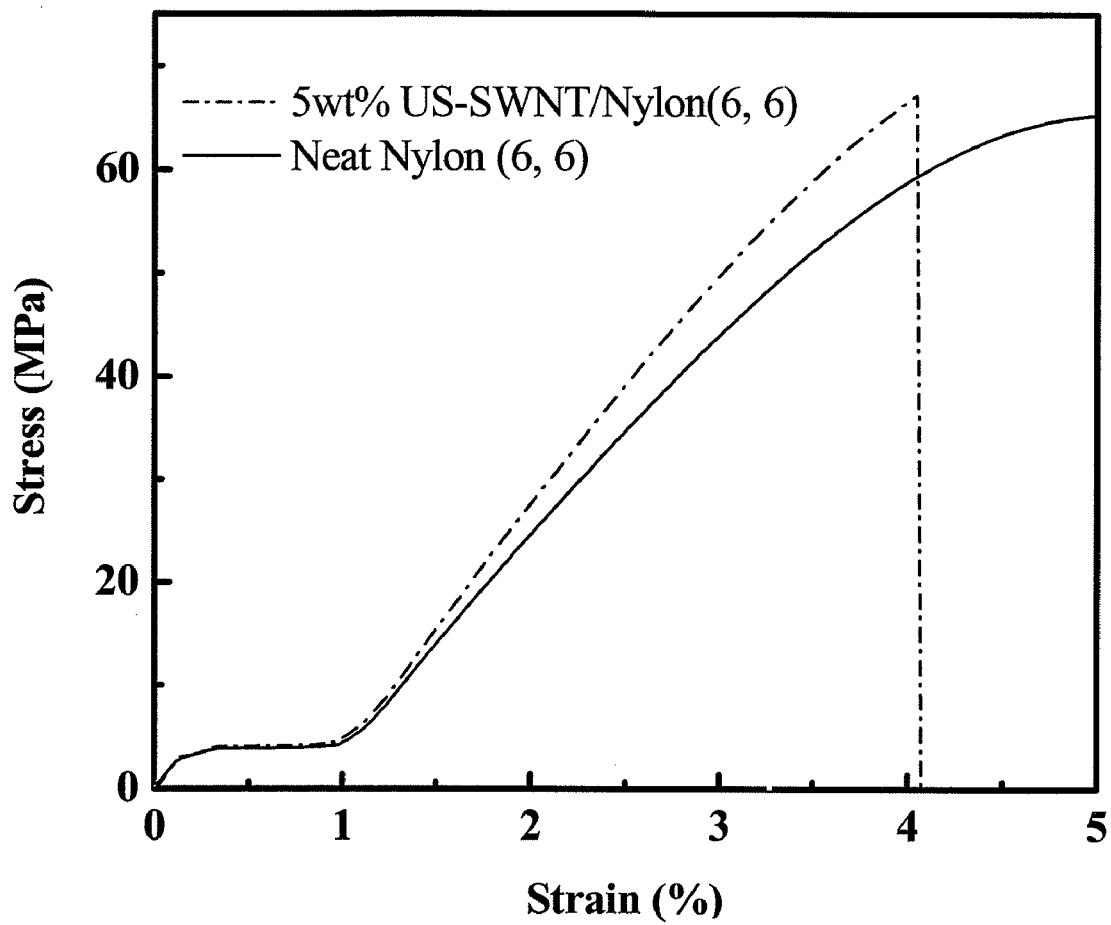
FIG. 13 is typical tensile stress versus strain curves for 1) neat Nylon (6,6) (solid curve), and 2) 5 wt % US-SWNT/Nylon (6,6) composite (dash-dot curve)

Table 3 and FIG. 13 show the tensile properties of the US-SWNT/Nylon (6,6) composites versus neat Nylon. The tensile testing was performed on INSTRON 4505 with 5 mm/min crosshead speed. A 15% average increase in tensile modulus was determined over neat Nylon with 5 wt % US-SWNT incorporation; however, the tensile toughness appears to have been decreased based upon testing.

TABLE 3

Average tensile properties of SWNT/Nylon (6, 6) composites and neat Nylon.

| Sample | Young's Modulus (GPa) | Tensile Strength (MPa) |
|---|---|---|
| Neat Nylon (6,6) | 2.17 | 63.18 |
| 5 wt % US-SWNT/Nylon (6,6) | 2.47 | 67.23 |

EXAMPLE NO. 4

This Example serves to illustrate a US-SWNT/PAN composite fiber process and the products made therefrom, in accordance with some embodiments of the present invention.

A US-SWNT/PAN composite material was created. US-SWNT were created using a process similar to the process described in Example No. 1. About 250 mg of the US-SWNT were dissolved in a quantity of DMSO to give 1 wt % US-SWNTs. About 4.75 g of PAN powder was added to the US-SWNT/DMSO solution to create a 5:95 wt % US-SWNT/PAN dope. The dope was prepared by mixing in a glass resin kettle for two days. The mixed dope was transferred to a spinning reservoir, spun, and then coagulated in a 60:40 DMSO:water bath at room temperature. The spin-draw ratio was around 14.7× and an air gap of 3 mm was maintained. The resulting fibers were wet drawn with a 2× spin-draw ratio in 60:40 DMSO:water. A hot draw in about 90° C. water occurred with an about 1.75× spin-draw ratio maintained. The resultant fibers were washed overnight to remove residue DMSO, air dried for 1 hour, and vacuum dried at room temperature overnight.

Figure 14A:
FIGS. 14A and 14B are SEM images of 5 wt % US-SWNT/PAN composite fiber.
Figure 14B:
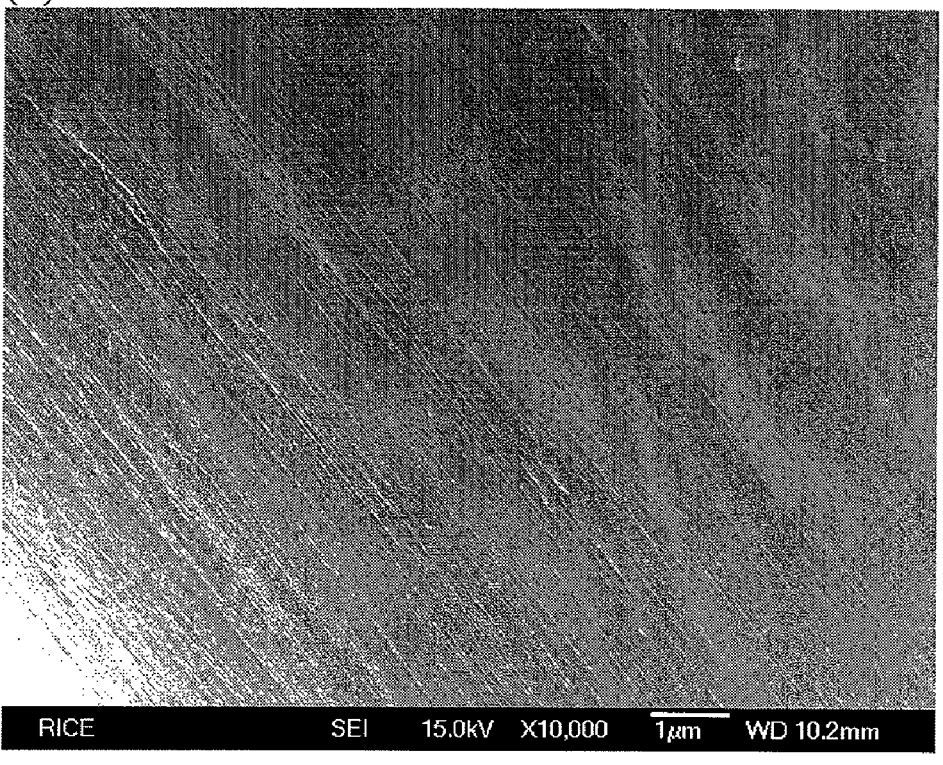

SEM images of the morphology of the US-SWNT/PAN fiber is shown in FIGS. 14A and 14B.

EXAMPLE NO. 5

This Example serves to illustrate a US-SWNT/PPTA composite fiber process, in accordance with some embodiments of the present invention.

Figure 15:
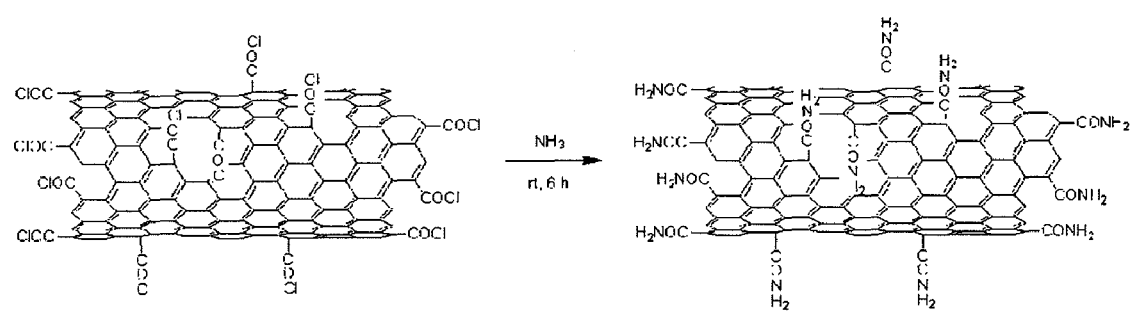
FIG. 15 schematically represents the conversion of carboxylated US-SWNT to US-SWNT-amide.
Figures 16A, 16B:
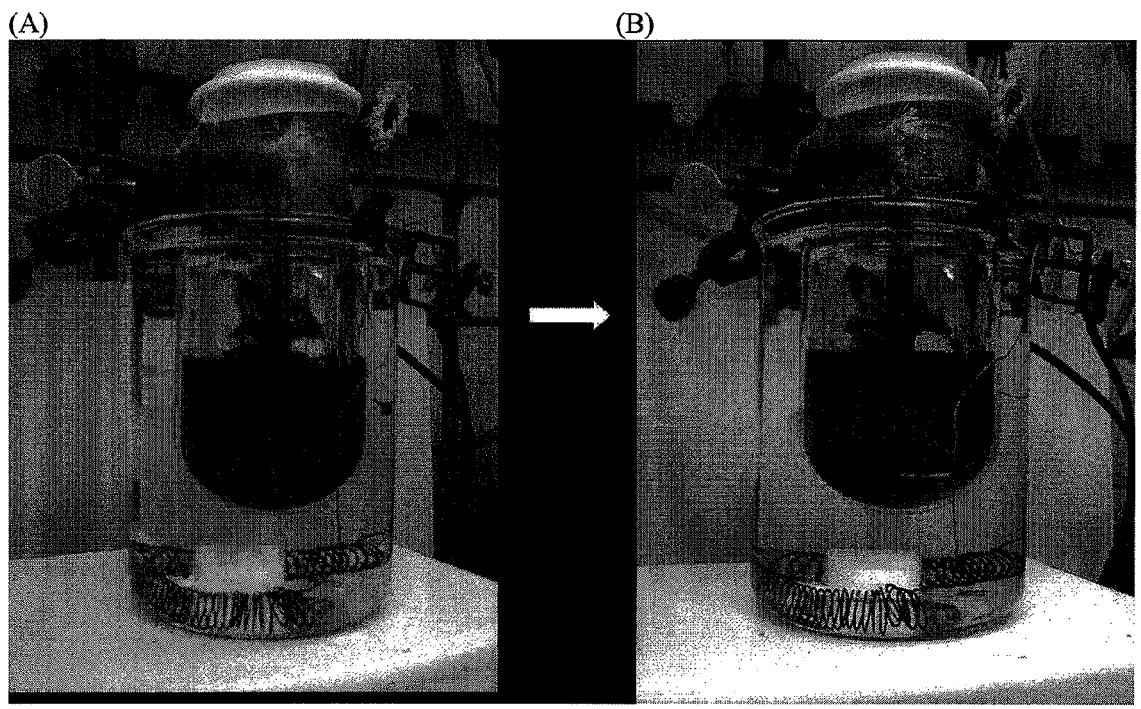
FIGS. 16A and 16B are photographs showing stir opalescence of a 0.8/99.2 US-SWNT-amide/PPTA composition in 100% $H_2SO_4$ (15 wt %)

A US-SWNT/PPTA composite material was created. US-SWNTs were created using the process described in Example No. 1. The US-SWNTs were further functionalized and converted to a US-SWNT-amide by reaction with $NH_3$ at room temperature for 6 hours. FIG. 15 illustrates the reaction and the resulting US-SWNT-amide product. About 50 mg of the US-SWNT-amide material was dissolved in 18.8 cc of a 102 wt % $H_2SO_4$ solution using sonication. A commercialized PPTA pulp was dried in a vacuum overnight to remove any absorbed moisture. The US-SWNT-amide/$H_2SO_4$ solution was added to the PPTA pulp in a glass resin kettle under nitrogen purge to generate a 0.8/99.2 wt % US-SWNT-amide/PPTA dope. The mixture was blended in a resin kettle at 65° C. for 5 days with a setup similar to the vessel shown in FIG. 16A. As can be observed in FIG. 16B, the mixing of the 0.8/99.2 wt % US-SWNT-amide/PPTA dope revealed an effect called "stir opalescence" during blending of the material. The composition was transferred to a spinning reservoir and spun at 55° C. The resultant fibers were coagulated in an ice water bath while having a spin-draw ratio of around 20×. Finally, the spun fibers were heat treated at 400° C. under a nitrogen atmosphere and drawn again at 3%. The resident time for the heat treatment was 30 seconds.

The tensile properties of the resultant heat-treated US-SWNT/PPTA fibers are shown in Table 4.

TABLE 4

Average tensile properties of 0.8 wt % US-SWNT/PPTA composite.

| Sample | Tensile Strength | Elongation to break | Tensile Modulus | Storage Modulus |
|---|---|---|---|---|
| 0.8 wt % US-SWNT/PPTA | 1.42 GPa | 1.5% | 103 GPa | N/A |

EXAMPLE NO. 6

This Example serves to illustrate a US-SWNT/PBO composite manufacturing process, in accordance with some embodiments of the present invention.

Figure 17:
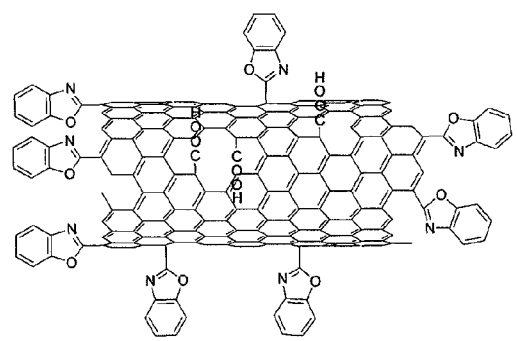
FIG. 17 schematically represents the US-SWNT-benzoxaole material.
Figure 18:
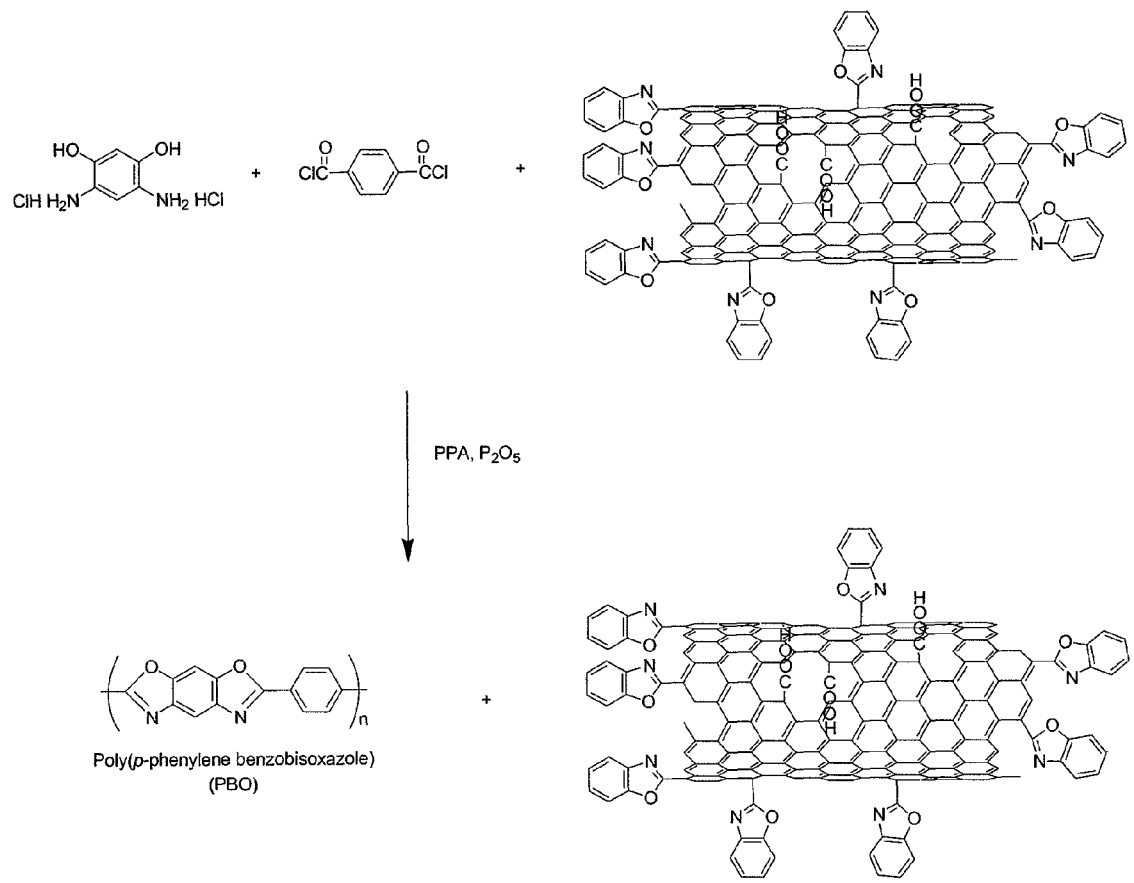
FIG. 18 schematically represents the physical mixing and in-situ polymerization of high MW PBO with US-SWNT-benzoxaole material.

A US-SWNT/PBO composite material was created. US-SWNTs were created using the process described in Example No. 1. US-SWNTs were further functionalized and converted to a US-SWNT-benzoxazole material by reaction US-SWNTs with benzoxazole at 150° C. in a kettle with a solution containing polyphosphoric acid (PPA) at 150° C. for 6 hours. The reaction product was cooled to 55° C. FIG. 17 illustrates the resulting US-SWNT-benzoxazole product. After creation of US-SWNT-benzoxazole material (about 0.05 g), equal molar parts of 4,6-diaminoresorcinol dihydrochloride (DAR) and terephthalic acid dichloride (TPC) were added to the kettle to create a 99:1 PBO:US-SWNT wt % polymer mixture, along with about 23.5 g of PPA and 12.3 g of phosphorous pentoxide ($P_2O_5$). The DAR-TPC-US-SWNT-benzoxazole mixture was allowed to stir for 16 hours at 55° C. to facilitate dechlorination of the monomer species. Additional $P_2O_5$ was added to the mixture to adjust the effective concentration of PPA to about 82%, the temperature was increased to 75° C., and the mixture allowed to stir for another 8 hours. Polymerization was induced by increasing the temperature up to 100° C., raising the PPA concentration to about 84.3%, and stirring the mixture for an additional 16 hours. A series of time and temperature adjustments were made to foster the continuing polymerization reaction. The material was allowed to stir for 8 hours at 125° C., then stirred for 16 hours at 150° C., and finally at 185° C. for 24 hours. Stir opalescence was observed while stirring the mixture during the 150° C. interval. The in-situ reaction and creation of a high molecular weight PBO with the incorporated US-SWNT-benzoxazole material is represented in FIG. 18.

Although the present invention is described with several embodiments, various changes and modifications may be suggested to one skilled in the art. In particular, the present invention is described with reference to certain polymers and materials and methods of processing those materials, but may apply to other types of processing or materials with little alteration and similar results. Furthermore, the present invention contemplates several process steps that may be performed in the sequence described or in an alternative sequence without departing from the scope and the spirit of the present invention. The present invention is intended to encompass such changes and modifications as they fall within the scope and the spirit of the appended claims.

What is claimed is:
1. A process comprising:
   intercalating a plurality of carbon nanotubes with a superacid to form a homogenous dispersion of individual carbon nanotubes;
   introducing a reactive agent into the homogenous dispersion of individual carbon nanotubes; and
   reacting the plurality of individual carbon nanotubes with the reactive agent while the individual carbon nanotubes are homogenously dispersed in the superacid;
      wherein the reactive agent simultaneously reduces the length of the individual carbon nanotubes to less than about 60 nm and functionalizes the individual carbon nanotubes on both the ends and sidewalls of the carbon nanotubes.

2. The process of claim 1, further comprising:
after reacting, dissolving the plurality of carbon nanotubes in a solvent selected from the group consisting of water, alcohols, aprotic solutions, acidic solutions, and combinations thereof.

3. The process of claim 1, wherein the superacid comprises oleum.

4. The process of claim 1, wherein the reactive agent comprises nitric acid.

5. The process of claim 1, wherein the reactive agent comprises a mixture of sulfuric acid and hydrogen peroxide.

6. The process of claim 1, wherein the reactive agent comprises ozone.

7. The process of claim 1, wherein the reactive agent is miscible with the superacid.

8. The process of claim 1, wherein the length of the individual carbon nanotubes is between about 20 nm and about 30 nm.

* * * * *